US009835371B2

United States Patent
Yun et al.

(10) Patent No.: US 9,835,371 B2
(45) Date of Patent: Dec. 5, 2017

(54) REFRIGERATOR AND FILTER DEVICE (71) Applicant: LG ELECTRONICS INC., Seoul (KR)

(72) Inventors: Jongho Yun, Seoul (KR); Kyunghoon Koak, Seoul (KR); Bongjun Kim, Seoul (KR); Siyeon An, Seoul (KR)

(73) Assignee: LG Electronics Inc., Seoul (KR)

( * ) Notice: Subject to any disclaimer, the term of this patent is extended or adjusted under 35 U.S.C. 154(b) by 284 days.

(21) Appl. No.: 14/595,347

(22) Filed: Jan. 13, 2015

(65) Prior Publication Data
US 2015/0226473 A1 Aug. 13, 2015

(30) Foreign Application Priority Data

Feb. 12, 2014 (KR) .......................... 10-2014-0015797

(51) Int. Cl.
*F25D 23/12* (2006.01)
*B01D 35/30* (2006.01)

(52) U.S. Cl.
CPC .......... *F25D 23/126* (2013.01); *B01D 35/30* (2013.01); *F25D 23/12* (2013.01); *B01D 2201/30* (2013.01); *B01D 2201/304* (2013.01); *F25D 2323/121* (2013.01); *Y10T 137/6851* (2015.04)

(58) Field of Classification Search
None
See application file for complete search history.

(56) References Cited

U.S. PATENT DOCUMENTS

| 6,645,376 B2 | 11/2003 | Marioni |
| 7,658,212 B2 * | 2/2010 | Meuleners ............ F25D 23/126 141/360 |
| 2003/0015464 A1 | 1/2003 | Marioni |

(Continued)

FOREIGN PATENT DOCUMENTS

| CN | 1856450 | 11/2006 |
| CN | 101769666 | 7/2010 |

(Continued)

OTHER PUBLICATIONS

Office Action issued in Chinese Application No. 201510029474.3 dated Oct. 8, 2016, 12 pages (with English translation).

(Continued)

*Primary Examiner* — Benjamin Kurtz
(74) *Attorney, Agent, or Firm* — Fish & Richardson P.C.

(57) ABSTRACT

A refrigerator and filter device are described. In one aspect, the refrigerator includes a main body that defines a storage space. The refrigerator includes a door that is configured to open and close at least a portion of the storage space. The refrigerator further includes a dispenser that is located at the door and is configured to dispense water. The refrigerator further includes a filter that is configured to purify water and supply the purified water to the dispenser. The refrigerator further includes at least two heads that are configured to attach to the filter. The refrigerator further includes a connector that is configured to connect the at least two heads to each other, the connector providing a passage between the at least two heads. The refrigerator further includes a bracket on which the connector and the at least two heads are seated, the bracket being coupled to the connector.

12 Claims, 9 Drawing Sheets

(56) References Cited

U.S. PATENT DOCUMENTS

| | | |
|---|---|---|
| 2003/0024860 A1 | 2/2003 | Fritze |
| 2003/0168394 A1* | 9/2003 | Gill .................. B01D 35/30 210/249 |
| 2005/0103721 A1 | 5/2005 | Fritze |
| 2008/0087597 A1 | 4/2008 | Johann |
| 2009/0025826 A1 | 1/2009 | Meuleners |
| 2009/0289003 A1 | 11/2009 | Tsai |
| 2012/0042677 A1 | 2/2012 | Mitchell |
| 2014/0230481 A1 | 8/2014 | Yun |

FOREIGN PATENT DOCUMENTS

| | | |
|---|---|---|
| CN | 102997549 | 3/2013 |
| CN | 105509397 | 4/2016 |
| DE | 60201111 T2 | 9/2005 |
| DE | 102006049084 A1 | 4/2008 |
| EP | 1 277 398 A1 | 1/2003 |
| EP | 1 918 252 A2 | 5/2008 |
| EP | 2 770 280 A2 | 8/2014 |
| KR | 10-2010-0081910 | 7/2010 |
| KR | 10-2011-0053606 A | 5/2011 |
| KR | 10-1069736 | 9/2011 |
| WO | WO 2011/059168 A2 | 5/2011 |

OTHER PUBLICATIONS

European Search Report dated Jun. 26, 2015 for European Application No. EP 14197543, 8 Pages.

\* cited by examiner

REFRIGERATOR AND FILTER DEVICE

CROSS-REFERENCE TO RELATED APPLICATION

The present application claims priority under 35 U.S.C. 119 and 35 U.S.C. 365 to Korean Patent Application No. 10-2014-0015797 (filed on Feb. 12, 2014), which is hereby incorporated by reference in its entirety.

FIELD

The present disclosure relates to a refrigerator and a filter device of the refrigerator.

BACKGROUND

Refrigerators are home appliances for storing foods at a low temperature. Such a refrigerator includes one or all of a refrigerating compartment for storing foods in a refrigerated state and a freezing compartment for storing foods in a frozen state.

In recent years, a dispenser may be mounted on a front surface of a door of the refrigerator. Thus, drinking water may be dispensed through the dispenser without opening the refrigerator door. Also, an ice maker for making ice cubes to store the made ice cubes may be disposed on the refrigerator door or in the storage compartment. Thus, the ice cubes may be dispensed through the dispenser. The drinking water may be supplied from an external water supply source. The supplied water may be supplied into the dispenser after passing through a filter device. Alternatively, the supplied water may be supplied into a water tank provided in the refrigerator, and the water stored in the water tank may be supplied into the dispenser and/or an ice maker after being cooled by cool air within the refrigerator so that the supply of water for dispensing drinking water to the outside or making an ice cube is enabled.

A plurality of filters are aligned in the filter device, and the filter device is mounted at a predetermined position of the refrigerator. The filter device may be connected through a predetermined duct, and the duct may be fitted in a press-fit manner.

SUMMARY

According to an innovative aspect of the subject matter described in this specification may be implemented in a refrigerator that includes a main body that defines a storage space; a door that is configured to open and close at least a portion of the storage space; a dispenser that is located at the door and is configured to dispense water; a filter that is configured to purify water and supply the purified water to the dispenser; at least two heads that are configured to attach to the filter; a connector that is configured to connect the at least two heads to each other, the connector providing a passage between the at least two heads; and a bracket on which the connector and the at least two heads are seated, the bracket being coupled to the connector.

These and other embodiments can each optionally include one or more of the following features. The connector is configured to connect to the at least two heads and rotate. The refrigerator further includes a coupling protrusion that is configured to restrict rotation of the connector and that is located on a portion of the bracket in a rotation path of the connector. The connector includes a coupling part, and the bracket includes a coupling guide that is configured to guide coupling of the coupling part and on which the coupling protrusion is located. The connector further includes a handle, and the coupling part includes a portion of the handle. The bracket defines an opening that allows the handle to rotate. The connector and the head are seated on the bracket and are coupled to each other. A sealer is located on a contact part between the connector and the head.

Another innovative aspect of the subject matter described in this specification may be implemented in a filter device of a refrigerator that includes at least two filters that are configured to purify water; at least two heads that are configured to attach to the at least two filters, respectively; a bracket on which the at least two heads are seated; a connector that is configured to connect the at least two heads to each other to provide a passage between the at least two heads, the connector being rotatable about a shaft connecting the at least two heads to each other; and a coupling guide that is located on the bracket and configured to contact the connector at a predetermined rotation angle of the connector to couple the connector to the bracket.

These and other embodiments can each optionally include one or more of the following features. The bracket defines an opening that allows the connector to rotate backward. The filter device further includes a seating protrusion located on an outer circumference of the connector; and a seating guide located on the bracket and configured to restrict left and right movement of the connector by the seating protrusion located on the seating guide. The filter device further includes a sealing protrusion located on an outer circumference of the connector; a seating end located on an end of one of the at least two heads; a sealer inserted into a contact part between the sealing protrusion and the seating part; and a sealing guide located on the bracket and configured to restrict movement of the sealing protrusion and the seating end. The filter device further includes a coupling protrusion that is configured to restrict rotation of the connector and that is located at a predetermined position on the coupling guide. The coupling guide has an opened front side.

Another innovative aspect of the subject matter described in this specification may be implemented in a refrigerator that includes a main body that defines a storage space; a door that is configured to open and close at least a portion of the storage space; a dispenser that is located at the door and is configured to dispense water; at least two filters that are configured to purify water and supply the purified water to the dispenser; at least two heads that are configured to connect to the at least two filters, respectively; a connector that is configured to connect the at least two heads to each other, the connector providing a passage between the at least two heads; and a bracket on which the at least two heads are seated, the bracket being coupled to the connector and allowing the connector to rotate at a predetermined angle.

These and other embodiments can each optionally include one or more of the following features. A coupling guide that includes a portion that is opened to allow the connector to pass through and configured to guide the rotation of the connector, the portion being located on the bracket. A coupling protrusion that is configured to restrict a rotation of the rotating connector and is located on the coupling guide. The connector includes a cylindrical body that includes a passage; and a handle extending from the cylindrical body, where a coupling part coupled to the connector is located on the handle. A seating protrusion is located on an outer circumference of the connector, and a seating guide that is located on the bracket and is configured to restrict left and right movement of the seating protrusion. A sealing protrusion is located on an outer circumference of the connector, a seating end is located on an end of one of the at least two heads, and a sealing guide that is configured to restrict the sealing protrusion and the seating end and is located on the bracket.

DETAILED DESCRIPTION

Figure 1:
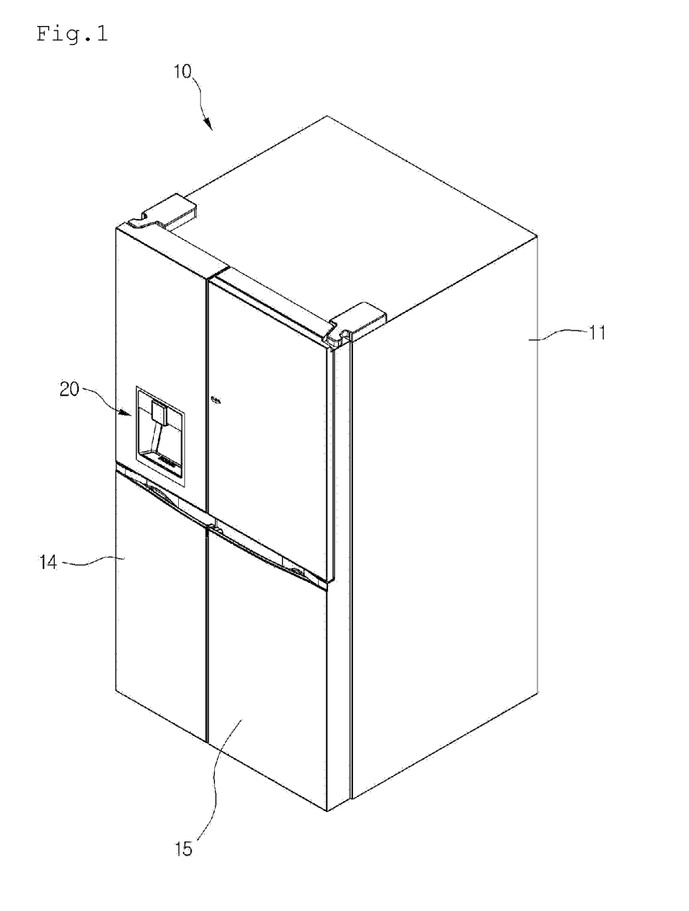
FIG. 1 is a perspective view of an example refrigerator.
Figure 2:
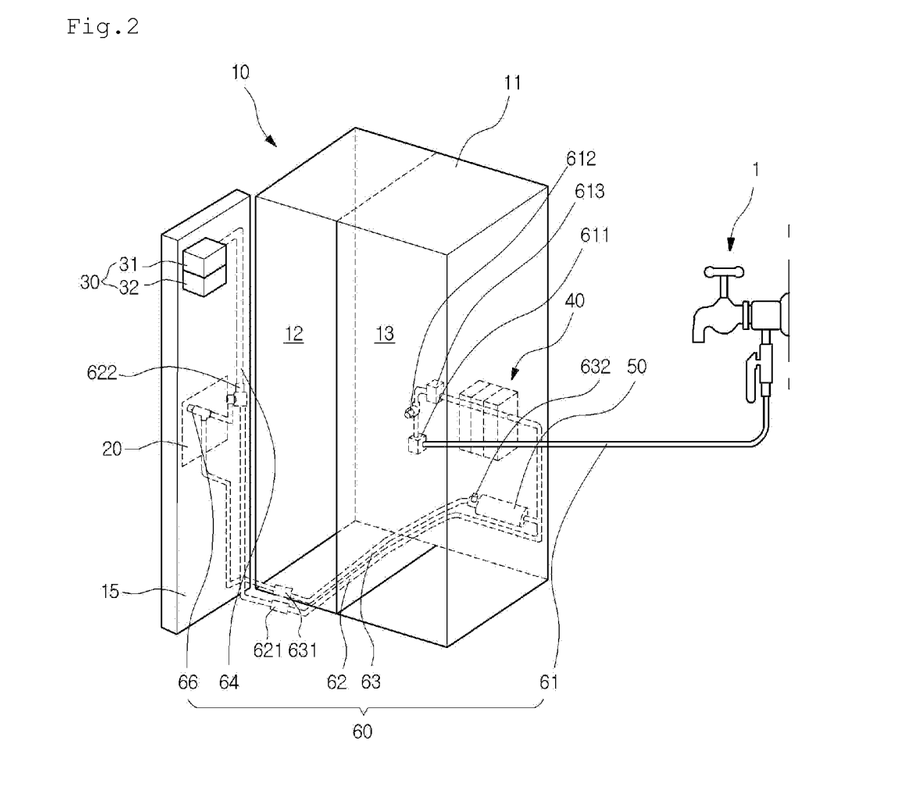
FIG. 2 is a schematic view of an arrangement of passages through which water of an example refrigerator flows.

FIG. 1 illustrates an example refrigerator, and FIG. 2 illustrates an example arrangement of passages through which water of an example refrigerator flows.

Referring to FIGS. 1 and 2, a refrigerator 10 includes a main body 11 having a storage space with a front surface opened and a door for opening/closing the storage space.

Some implementations of the storage space may be different according to kinds and configurations of refrigerators. For example, although a freezing compartment 12 is disposed at a left side, and a refrigerating compartment 13 is disposed at a right side with respect to a barrier in FIG. 1, the current implementation is not limited to kinds of refrigerators, positions of the freezing compartment and refrigerating compartment, and the number of freezing compartment and refrigerating compartment. Also, features described with reference to the accompanying drawings are not limited to the technical features of the present disclosure.

The door may include a freezing compartment door 14 and a refrigerating compartment door 15. Also, upper and lower ends of the door may be rotatably connected to the main body 11 by hinges to open or close each of a refrigerating compartment 13 and a freezing compartment 12.

A dispenser 20 may be disposed on a front surface of the freezing compartment door 14 or the refrigerating compartment door 15. For example, FIG. 1 illustrates the dispenser 20 disposed in the freezing compartment door 14. The dispenser 20 may dispense water or ice cubes at the outside without opening the freezing compartment door 14. The dispenser 20 may have a shape that is recessed from a front surface of the freezing compartment door 14.

An ice making device 27 is disposed on a back surface of the freezing compartment door 14. The ice making device 27 may freeze supplied water to make ice cubes, thereby storing the made ice cubes. Particularly, the ice making device 27 may include an automatic ice maker 28 in which water is automatically supplied to make ice cubes and transfer the made ice cubes and an ice bank 29 disposed under the automatic ice maker 28 to store the ice cubes transferred from the automatic ice maker 28.

The ice bank 29 may communicate with the dispenser 20 through an ice chute. Thus, when the dispenser 20 is manipulated, the ice cubes within the ice bank 29 may be dispensed through the dispenser 20 to the outside. In some implementations, the dispenser 20 is configured to dispense the stored ice cubes in a cubed ice state or crushed ice rubble state according to user's selection may be further provided in the ice bank 29.

A filter device 40 for purifying water supplied from the external water supply source and a water tank 50 for storing the water purified by passing through the filter device 40 to cool the stored water by using cool air may be disposed in the main body 11.

The filter device 40 will be described below in detail.

To supply water into the dispenser 20 and the ice making device 27, the refrigerator 10 may be connected to an external water supply source 1. Also, a water supply flow path 60 connected to the water supply source 1, the filter device 40, the water tank 50, the dispenser 20, and the ice making device 27 to guide a flow of the water may be disposed in the main body 11 and the freezing compartment door 14.

The water supply flow path 60 may include a water supply passage 61 connecting the water supply source 1 disposed outside the main body 11 such as a water pipe to the filter device 40 disposed in the main body 11, a purified water passage 62 for guiding the purified water into the dispenser 20, a cold water passage 63 for guiding the water purified by the filter device 40 into the dispenser 20 via the water tank 50, and an ice making passage 64 branched from the purified water passage 62 to guide the water purified by the filter device 40 into the ice making device 27.

The water supply flow path 60 may extend from the water supply source 1 to the inside of the main body 11 and then be connected to the filter device 40. Here, the water supply passage 61 may be provided in two tubes with respect to the main body 11 and connected to a fitting member 611. Here, the fitting member 611 may be disposed on a rear surface of the main body 11 so that a user selectively separates a tube of the water supply passage 61, which is connected to the water supply source 1.

A water supply valve 612 may be disposed in the water supply passage 61. The water supply valve 612 may open or close the water supply passage 61 to adjust an amount of water supplied into the filter device 40. The water supply valve 612 may be disposed at one side of the main body 11. In some implementations, the water supply valve 612 may be integrated with the fitting member 611.

The filter device 40 may be disposed in the refrigerating compartment 13. In some implementations, the water supply passage 61 may extend up to the inside of the refrigerating compartment 13. A cleaning passage 65 may be disposed in the filter device 40. The cleaning passage 64 may be connected to the water supply passage 61. Thus, the water of the water supply source 1 may be purified while passing through the filter device 40.

The purified water passage 62 may connect the filter device 40 to the dispenser 20. The purified water passage 62 may extend from an outlet of the filter device 40 to one side of the dispenser 20 to supply the water purified in the filter device 40 into the dispenser 20.

The purified water passage 62 may extend from the refrigerating compartment 13 in which the filter device 40 is disposed to the freezing compartment door 15 in which the dispenser is disposed. The purified water passage 62 may pass through a hinge connecting the main body 11 to the freezing compartment door 14. Here, a fitting member 621 may be disposed on the purified water passage 62 corresponding to the position of the hinge to connect the purified water passage 62 that is divided into two door-side and main body-side parts to each other. Thus, the connection and separation of the purified water passage 62 may be enabled according to the mounting and separation of the refrigerating compartment door 14.

A purified water valve 622 may be disposed in the purified water passage 62. The purified water valve 622 may open or close the purified water passage 62 to selectively discharge the purified water into the dispenser 20. The purified water valve 622 may be, for example, a three-way valve that divides the water supplied from the purified water passage 62 to supply the divided water into the dispenser 20 and the ice making device 27.

That is, the purified water valve 622 may be disposed in the purified water passage 62 and be connected to the ice making passage that is branched at the dispenser 20 or the freezing compartment door 14 to extend to the ice making device 27. Thus, the purified water passing through the filter device 40 may be directly dispensed into the dispenser 20 or supplied into the ice making device 27. Also, the purified water supplied through the ice making passage 64 may have a relatively high temperature to prevent the water within the ice making passage 64 disposed in the refrigerating compartment door 14 from being frozen while flowing along the ice making passage 64, thereby stably supplying the water into the ice making device 27.

The cold water passage 63 extends from the refrigerating compartment 13 to the freezing compartment door 14. The cold water passage 63 is configured to supply the water purified in the filter device 40 into the dispenser 20 after the water is cooled by passing through the water tank 50.

Here, the cold water passage 63 may be guided into the refrigerating compartment door 14 through the door hinge and be connected by the fitting member 631.

The cold water passage 63 may be directly connected to the filter device 40. Alternatively, the cold water passage 63 may be branched at the purified water passage 62 and then connected to the water tank 50. Also, a cold water valve 632 may be disposed in the cold water passage 63 to selectively open or close the cold water passage 63 so that the cold water to be dispensed through the dispenser 20 is selectively discharged.

The cold water valve 632 may be disposed in the cold water passage 63 between the water tank 50 and the dispenser 20. The cold water valve 632 may be opened or closed to determine the supply of water into the dispenser 20.

Figure 3:
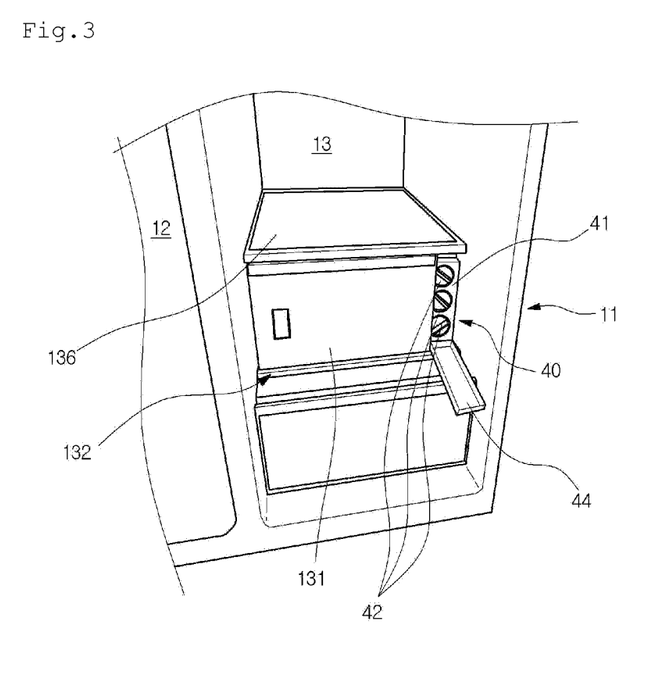
FIG. 3 is a partial perspective view of a portion of an inner space of an example refrigerator.
Figure 4:
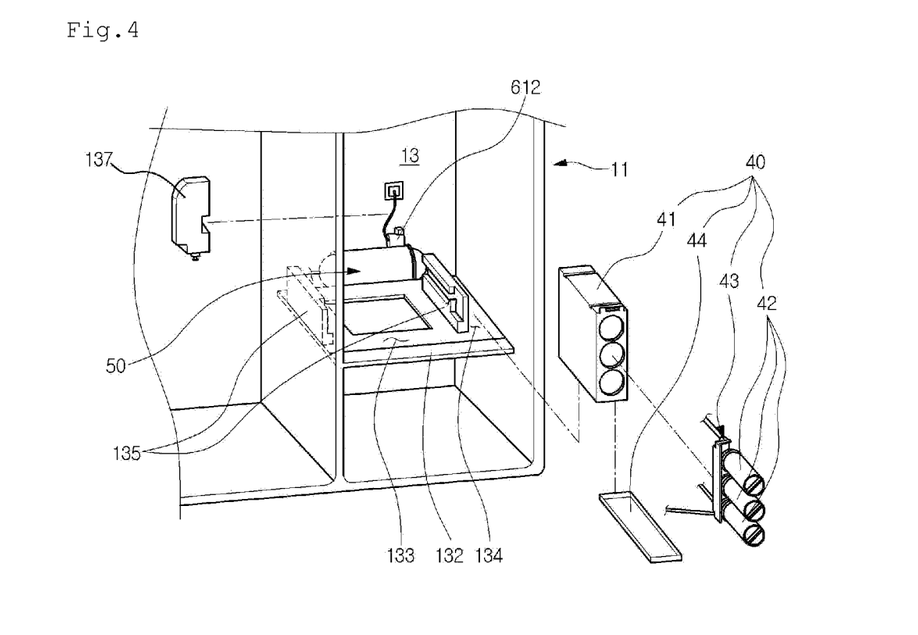
FIG. 4 is a view of mounted states of an example water tank and filter device.

FIG. 3 illustrates a portion of an inner space of an example refrigerator, and FIG. 4 illustrates mounted states of an example water tank and filter device.

Referring to FIGS. 3 and 4, a plurality of receiving members 131 such as a drawer and shelf may be disposed in the refrigerating compartment 13. The receiving members 131 may partition the inside of the refrigerating compartment to form receiving spaces having various shapes. Also, the receiving members 131 may be disposed adjacent to the filter device 40.

A support member 132 may be disposed on one side of the refrigerating compartment 13. The support member 132 may support the receiving member 131 and the filter device 40 from lower sides of the receiving member 131 and the filter device 40. Also, the support member 132 may be disposed on a bottom surface of the refrigerating compartment 13 or a top surface of the other receiving member. Also, the support member 132 may have a plate shape that horizontally partitions the inside of the refrigerating compartment 13.

A top surface of the support member 132 may be divided into two areas, i.e., a receiving member mounting part 133 for mounting the receiving members 131 and a filter device mounting part 134 for mounting the filter device 40. Also, a pair of insertion/withdrawal guides 135 for guiding slidable insertion or withdrawal of the receiving member 131 in a front/rear direction may be disposed on both left and right sides of the receiving member mounting part 133.

Also, the filter device 40 may be disposed on the filter device mounting part 134 and also be disposed between the receiving member 131 and an inner wall of the refrigerating compartment 13. Also, the filter device 40 may have front and top surfaces corresponding to those of the receiving member 131 so that the filter device 40 has a sense of unity with respect to the receiving member 131 inside the refrigerating compartment 13. Also, a shelf 136 may be mounted above the filter device 40 and the receiving member 131 to cover the receiving member 131 and the filter device 40 at the same time.

The filter device 40 includes one or more filters 42 that are connected to a bracket 43. The filters 42 and bracket 43 may be located inside a filter housing 41. The filter housing is configured to protect and conceal the filters 42. The filter housing 41 may be located on top of a tray 44. The tray 44 is configured to collect water that may leak from the filters 42 in order to prevent water from leaking into other areas of the refrigerator 10 around the filter device 40.

Rear surfaces of the receiving member 131 and the filter device 40 may be spaced apart from a rear wall of the refrigerating compartment 13. The water tank 50 may be disposed on the receiving member 131 and the filter device 40. The water purified in the filter device 40 may be stored in the water tank 50. Then, the water may be cooled by the cool air within the refrigerating compartment 13, and then the cold water may be supplied into the dispenser 20.

The water tank 50 may have a size that is capable of being accommodated between the receiving member 131 and filter device 40 and the wall of the refrigerating compartment 13 and receive water therein. Also, the water supply flow path 60 may be connected to the water tank 50, and the water tank 50 may be connected to the filter unit 40. Also, a portion of the cold water passage 63 connected to the dispenser 20 may be disposed in a space in which the water tank 50 is disposed. Also, the cold water valve 632 may be fixedly mounted on the rear wall of the refrigerating compartment 13 above the water tank 50. Also, for safety, the cold valve 632 may be covered by a valve cover 137. As described above, the water tank 50, the cold water valve 632, and a portion of the water supply flow path 60 may be disposed in a space defined between the rear wall of the refrigerating compartment 13 in which the water tank 50 is disposed and the receiving member 131 and filter device 40.

The receiving member 131 may have the same front/rear length as the filter device 40. Also, the front surface of the receiving member 131 and the front surface of the filter device 40 may be disposed on the same plane.

Figure 5:
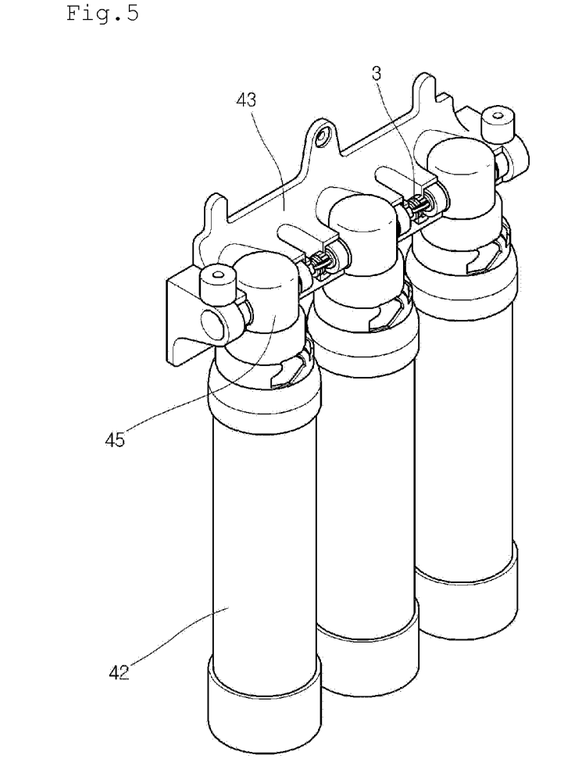
FIG. 5 is a perspective view of an example filter device.
Figure 6:
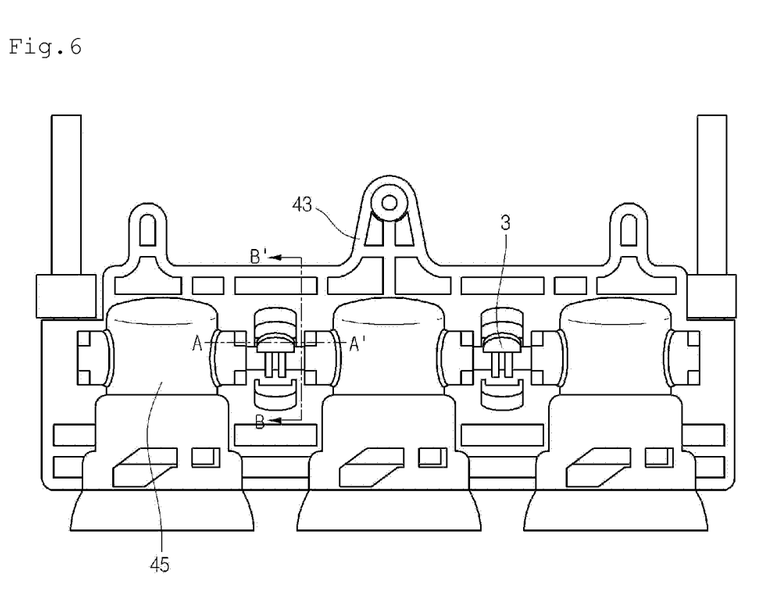
FIG. 6 is a front view of an example bracket and head.
Figure 7:
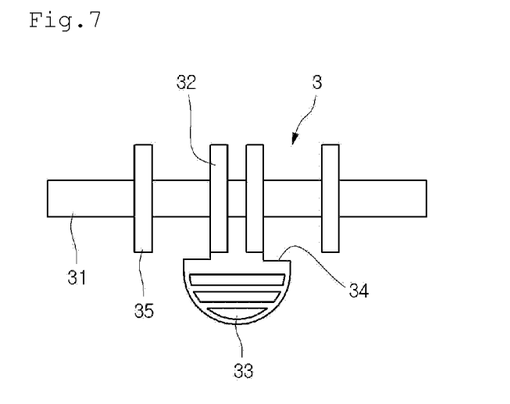
FIG. 7 is a front view of an example connector.

FIG. 5 illustrates an example filter device, FIG. 6 illustrates an example bracket and head, and FIG. 7 illustrates an example connector.

Referring to FIGS. 5 to 7, the filter device 40 may include a bracket 43, at least one head 45, and at least one filter 42. In some implementations, three heads 45 are fixed to the bracket 43, and three filters 42 are respectively fixed to the heads 45. A connector 3 is connected between the heads 45.

The head 45 may be connected by the connector 3. Since the connector 3 is coupled to the bracket 43, the head 45 and the filter 42 may be fixed to the bracket 43. In some implementations, the head 45 and the connector 3 are seated on the bracket 43 in the state where the head 45 and the connector 3 are connected to each other. Thereafter, the connector 3 rotates so that the connector 3 is fixed to a portion of the bracket 43. Here, the connector 3 may rotate about a shaft connecting the heads 45 to each other. That is, the connector 3 may rotate about a central axis of a cylindrical body 31. Thus, a coupling force of the connector 3 and the bracket 43 may be transmitted into the head 45, and the head 45 and the filter 42 fixed to the head 45 may be firmly fixed and maintained in the fixed state.

When water is supplied through one side of the bracket 43, the water may pass through the head 45 and then be introduced into the filter 42 coupled to the head 45. Thus, foreign substances within the water may be filtered. The water of which the foreign substances are filtered may be discharged again through the head and then be introduced into the next head through the connector. This process may be repeatedly performed. The water purified by passing through the three filters 42 may be drained through the other side of the bracket 43. The connector 3 may couple the bracket 43 to the head 45 and allow water to flow through an inner through-hole of the connector 3.

Referring to FIG. 7, the connector 3 may include an approximately cylindrical body 31 having an empty inner space through which water flows, a sealing protrusion 35 disposed on an outer circumference of the cylindrical body 31 to allow a contact part with the head 45 to be watertight, and a seating protrusion 32 for allowing the connector 3 to be seated on the bracket 43.

A handle 33 may be disposed on a portion of the seating protrusion 32 to allow a user to grasp the handle 33 so that the user rotates the connector 3. An inner portion of the handle 33 may be provided as a coupling part 34. Thus, the coupling part 34 may be hooked with one side of the bracket 43 to couple the connector 3 and the bracket 43 to each other.

The connector 3 may be formed of a resin material having predetermined strength to mechanically connect the heads 45 to each other. Thus, the connector 3 and the head 45, which are connected to each other, may move together with each other in a state where a structure of the connector 3 and the head 45 is maintained as a single assembly. Also, the single assembly may be utilized in a following assembly process. A passage may be provided in the connector 3 to function as a passage connecting the heads 45 to each other.

Figure 8:
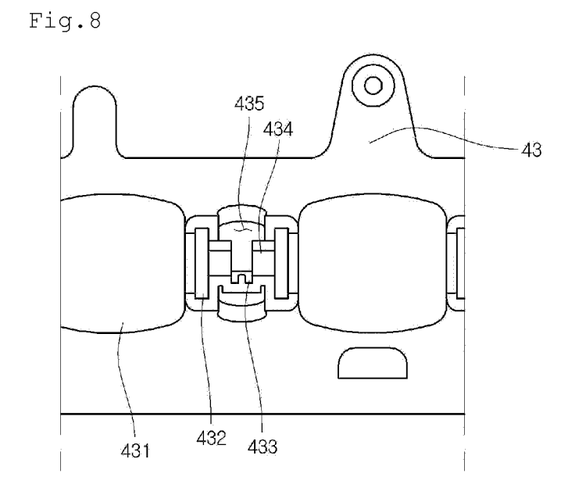
FIG. 8 is an enlarged front view of a portion of an example bracket on which the connector is placed.

FIG. 8 illustrates a portion of an example bracket on which the connector is placed.

Referring to FIG. 8, a head laying part 431 on which the head 45 is placed may be disposed on the bracket. The connector 3 may be seated on one side of the head laying part 431. A sealing guide 432 that is a portion on which the sealing protrusion 35 and a seating end 451 of the head 45 are seated while maintaining watertightness and a seating guide 433 on which the seating protrusion 32 is placed are provided on the portion on which the connector 3 is placed. An opening 435 that is opened to allow the handle 33 to rotate backward may be defined in a rear side of the seating guide 433. A coupling guide 434 may be disposed on the bracket to guide the coupling part 34 when the connector 3 rotates backward. The coupling guide 434 may be opened forward so that the connector 3 is inserted.

Figure 9:
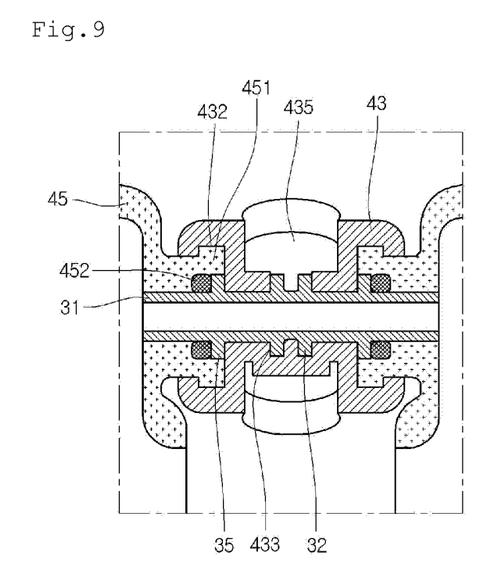
FIG. 9 is a cross-sectional view taken along line A-A' of FIG. 6.

The watertightness of the connector and the bracket may be more accurately understood in FIG. 9 with reference to the cross-sectional view taken along line A-A' of FIG. 6.

Referring to FIG. 9, a worker inserts the sealing protrusion 35 of the connector 3 into the seating end 451 of the head 45. Here, a sealer 452 may be further inserted before the sealing protrusion 35 is inserted to prevent water from leaking between the head 45 and the connector 3. Each of the above-described parts may be formed of plastic. Thus, in case of reworking, damage of the parts may be prevented, and the water leakage may also be prevented. The above-described processes may be repeatedly performed to couple three heads 45 to two connectors 3. An assembly of the head 45 and the connector 3 may be seated on the bracket 43. Here, the head 45 may be guided to the head seating part such as the head laying part 431 of FIG. 8, and the seating protrusion 32 of the connector 3 may be guided by the seating guide 433. Also, the portion at which the seating end 451 and the sealing protrusion 35 are assembled may be inserted in the state where the portion is guided by the sealing guide 432. The worker may seat the head 45 and the connector 3 through the above-described processes. Thus, work convenience may be improved.

The sealing guide 432 has a width that is limited in a horizontal direction of FIG. 9. Thus, the seating end 451 may be restricted in a state where the seating end 451 is pushed to a right side by a left end of the sealing guide 432, and the sealing protrusion 35 may be restricted in a state where the sealing protrusion 35 is pushed to a left side by a right end of the sealing guide 432. Thus, the sealer 452 may be disposed in a state where the sealer 452 is bidirectionally pressed, and a contact part between the head 45 and the connector 3 may be maintained in watertightness. An O-ring formed of an elastic material may be used as the sealer 452.

As understood in FIG. 9, it is seen that the head 45 and the connector 3 are horizontally maintained by the above-described various parts without having a gap therebetween. However, the head 45 and the connector 3 may be in a state in which the head 45 and the connector 3 are not restricted inward and outward and thus be separated from the bracket 43. In this state, a gap may be provided so that the head 45 and the connector 3 may be vibrated. Thus, the head 45 and the connector 3 may not be completely fixed to each other. As a result, the handle 33 may rotate backward to completely couple the connector 3 to the bracket 43. Therefore, the worker may more assemble the filter device without performing a coupling process using a screw.

Figure 10:
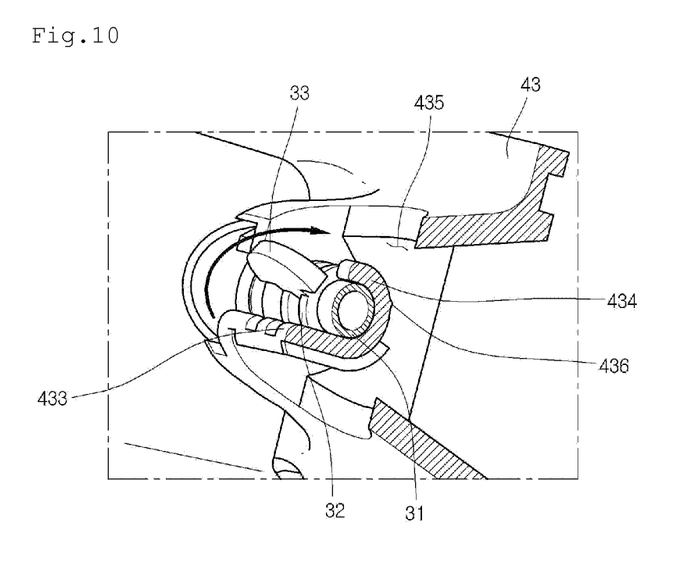
FIG. 10 is a cross-sectional perspective view taken along line B-B' of FIG. 6.

FIG. 10 is a cross-sectional perspective view taken along line B-B' of FIG. 6.

Referring to FIG. 10, in the state where the connector 3 is placed on the bracket 43, the connector 3 may rotate about a central axis of the cylindrical body 31. Thus, the worker may rotate the handle 33 backward. Because the seating protrusion 32 is guided by the seating guide 433, the connector 3 may not be horizontally vertically vibrated.

The handle 33 may pass through the opening 435 to rotate backward. Then, when the handle 33 rotates at a predetermined angle or more, the handle 33 may be guided by the coupling guide 434. Since the handle 33 is hooked with the coupling guide 434, the connector 3 may not be separated forward. That is, even if it is intended to separate the connector 3 forward (i.e., a left side in the drawings), the handle 33 may be hooked with the coupling guide 434 to prevent the connector 3 from being separated forward.

When the handle 33 continuously rotates, the handle 33 may reach the coupling protrusion 436. Here, the worker may further apply a force to the handle 33 so that the coupling part 34 of the handle 33 passes over the coupling protrusion 436. Thus, the coupling part 34 may pass over the coupling protrusion 436. As a result, the coupling process of the connector 3 and the bracket 43 may be finished. Here, the coupling part 34 may contact a stopper 439 and thus not rotates any more. Thus, even though external vibration or impact is applied, the handle may not reversely rotate and thus be firmly coupled at a predetermined angle. The interaction between the coupling part 34 and the coupling protrusion 436 may be understood with reference to the rear cutoff perspective view of the bracket 43 that is described in FIG. 11.

Figure 11:
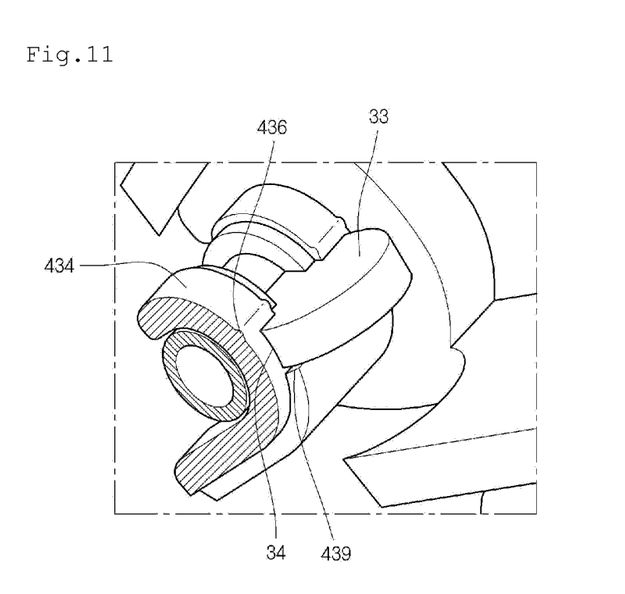
FIG. 11 is a rear cutoff perspective view of an example bracket.

When the coupling process is finished through the above-described processes, the connector may not move in all directions, i.e., front/rear, left/right, and upward/downward directions, but be fixed at an accurate position without having the gap. In addition, the head connected to the connector 3 may be stably placed at its proper seating position. Since the connector is fixed to the stable position without having the gap, the watertightness may be improved.

What is claimed is:

1. A filter device of a refrigerator, comprising:
   at least two filters that are configured to purify water;
   at least two heads that are configured to attach to the at least two filters, respectively;
   a bracket on which the at least two heads are seated;
   a connector that is configured to connect the at least two heads to each other to provide a passage between the at least two heads, the connector being rotatable about a shaft connecting the at least two heads to each other; and
   a coupling guide that is located on the bracket and configured to contact the connector at a predetermined rotation angle of the connector to couple the connector to the bracket.

2. The filter device according to claim 1, wherein the bracket defines an opening that allows the connector to rotate in a first direction.

3. The filter device according to claim 1, further comprising:
   a seating protrusion located on an outer circumference of the connector; and
   a seating guide located on the bracket and configured to restrict left and right movement of the connector by the seating protrusion located on the seating guide.

4. The filter device according to claim 1, further comprising:
   a sealing protrusion located on an outer circumference of the connector;
   a seating end located on an end of one of the at least two heads;
   a sealer inserted into a contact part between the sealing protrusion and the seating part; and
   a sealing guide located on the bracket and configured to restrict movement of the sealing protrusion and the seating end.

5. The filter device according to claim 1, further comprising a coupling protrusion that is configured to restrict rotation of the connector and that is located at a predetermined position on the coupling guide.

6. The filter device according to claim 1, wherein the coupling guide defines an opening.

7. A refrigerator comprising:
   a main body that defines a storage space;
   a door that is configured to open and close at least a portion of the storage space;
   a dispenser that is located at the door and is configured to dispense water;
   at least two filters that are configured to purify water and supply the purified water to the dispenser;
   at least two heads that are configured to connect to the at least two filters, respectively;
   a connector that is configured to connect the at least two heads to each other, the connector providing a passage between the at least two heads; and
   a bracket on which the at least two heads are seated, the bracket allowing the connector to rotate at a predetermined angle and including a coupling protrusion that is configured to restrict a rotation of the connector in a state in which the connector rotates at the predetermined angle.

8. The refrigerator according to claim 7, wherein a coupling guide that includes a portion that is opened to allow the connector to pass through and configured to guide the rotation of the connector, the portion being located on the bracket.

9. The refrigerator according to claim 8, wherein the coupling protrusion is located on the coupling guide.

10. The refrigerator according to claim 7, wherein a seating protrusion is located on an outer circumference of the connector, and
    a seating guide that is located on the bracket and is configured to restrict left and right movement of the seating protrusion.

11. A refrigerator comprising:
    a main body that defines a storage space;
    a door that is configured to open and close at least a portion of the storage space;
    a dispenser that is located at the door and is configured to dispense water;
    at least two filters that are configured to purify water and supply the purified water to the dispenser;
    at least two heads that are configured to connect to the at least two filters, respectively;
    a connector that is configured to connect the at least two heads to each other, the connector providing a passage between the at least two heads;
    a bracket on which the at least two heads are seated, the bracket being coupled to the connector and allowing the connector to rotate at a predetermined angle;
    a cylindrical body that includes the passage; and
    a handle extending from the cylindrical body,
    wherein a coupling part coupled to the connector is located on the handle.

12. A refrigerator comprising:
    a main body that defines a storage space;
    a door that is configured to open and close at least a portion of the storage space;
    a dispenser that is located at the door and is configured to dispense water;
    at least two filters that are configured to purify water and supply the purified water to the dispenser;
    at least two heads that are configured to connect to the at least two filters, respectively;
    a connector that is configured to connect the at least two heads to each other, the connector providing a passage between the at least two heads;
    a bracket on which the at least two heads are seated, the bracket being coupled to the connector and allowing the connector to rotate at a predetermined angle;
    a sealing protrusion that is located on an outer circumference of the connector;
    a seating end that is located on an end of one of the at least two heads; and a sealing guide that is configured to restrict the sealing protrusion and the seating end and that is located on the bracket.

* * * * *